United States Patent
Waldron et al.

(10) Patent No.: US 6,168,067 B1
(45) Date of Patent: Jan. 2, 2001

(54) HIGH STRENGTH FRICTION STIR WELDING

(75) Inventors: Douglas J. Waldron, Fountain Valley, CA (US); Richard G. Pettit, Ithaca, NY (US)

(73) Assignee: McDonnell Douglas Corporation, St. Louis, MO (US)

( * ) Notice: Under 35 U.S.C. 154(b), the term of this patent shall be extended for 0 days.

(21) Appl. No.: 09/102,806

(22) Filed: Jun. 23, 1998

(51) Int. Cl.$^7$ .............................. B23K 20/12; C22F 1/04
(52) U.S. Cl. ...................... 228/112.1; 228/114; 148/415; 148/535; 148/690
(58) Field of Search .................................. 228/112.1, 2.1, 228/222, 114, 46; 219/121.84; 148/523, 535, 690, 415

(56) References Cited

U.S. PATENT DOCUMENTS

| | | |
|---|---|---|
| 2,744,039 | 5/1956 | Siegel . |
| 3,234,643 | 2/1966 | Hollander . |
| 3,554,513 * | 1/1971 | Chance ..................................... 266/3 |
| 3,629,546 * | 12/1971 | Fry ................................... 219/121.84 |
| 3,773,260 * | 11/1973 | Kunioka et al. ........................ 239/10 |
| 3,948,428 * | 4/1976 | Bonomo et al. ........................ 228/46 |
| 4,223,197 * | 9/1980 | Imai et al. ............................ 219/61.7 |
| 4,236,920 * | 12/1980 | Lampe et al. ........................... 75/128 |
| 4,426,429 * | 1/1984 | Di Russo et al. .................... 428/654 |
| 4,589,932 * | 5/1986 | Park ..................................... 148/12.7 |
| 4,811,888 * | 3/1989 | Ziemek et al. ........................ 228/148 |
| 4,857,694 * | 8/1989 | Doyle et al. ....................... 219/76.12 |
| 4,897,124 * | 1/1990 | Matsuo et al. ........................... 148/2 |
| 5,014,901 * | 5/1991 | Moran .................................. 228/119 |
| 5,077,081 | 12/1991 | Bedford . |
| 5,122,339 * | 6/1992 | Pickens et al. ....................... 420/533 |
| 5,211,910 * | 5/1993 | Pickens et al. ....................... 420/532 |
| 5,259,897 * | 11/1993 | Pickens et al. ....................... 148/417 |

(List continued on next page.)

FOREIGN PATENT DOCUMENTS

| | | |
|---|---|---|
| 356133414 * | 10/1981 | (JP) . |
| 357207117 * | 12/1982 | (JP) . |
| 359136451 * | 8/1984 | (JP) . |
| 362192567 * | 8/1987 | (JP) . |
| 403271352 * | 12/1991 | (JP) . |
| 10286682 * | 10/1998 | (JP) . |
| 1000199 | 2/1983 | (SU) . |
| WO 99/39861 * | 8/1999 | (WO) . |

Primary Examiner—Patrick Ryan
Assistant Examiner—Kiley Stoner
(74) Attorney, Agent, or Firm—Alston & Bird LLP (57) ABSTRACT

A method for reducing material property degradation during friction stir welding. More specifically, the method includes the steps of solution heat treating first and second structural members at a first predetermined temperature schedule. The first and second structural members are then quenched to a predetermined temperature at which the structural members are in a nonequilibrium state and have an incomplete temper. The first structural member is then positioned adjacent to the second structural member, thereby defining an interface therebetween. Thereafter, the first and second structural members are joined to form a structural assembly by friction stir welding the material along the interface prior to precipitation heat treating the structural assembly. The structural assembly is then aged, such as by precipitation heat treating, at a second predetermined temperature schedule to stabilize the material properties of the resulting structural assembly, thereby completing the temper of the material. The method requires fewer manufacturing steps than conventional techniques for friction stir weld precipitation-hardened parent materials. In addition, the method minimizes the degradation of the material properties during friction stir welding, and produces a structural assembly with improved strength, hardness, and corrosion resistance, as well as dimensional quality.

18 Claims, 5 Drawing Sheets

U.S. PATENT DOCUMENTS

| | | | |
|---|---|---|---|
| 5,375,758 | * 12/1994 | Roberts, Sr. | 228/119 |
| 5,455,003 | * 10/1995 | Pickens et al. | 420/529 |
| 5,460,317 | 10/1995 | Thomas et al. . | |
| 5,462,712 | * 10/1995 | Langan et al. | 420/528 |
| 5,507,888 | * 4/1996 | Dickson, Jr. et al. | 148/690 |
| 5,611,479 | 3/1997 | Rosen . | |
| 5,794,835 | * 8/1998 | Colligan et al. | 228/2.1 |
| 5,837,070 | * 11/1998 | Sainfort et al. | 148/552 |
| 5,951,794 | * 9/1999 | Dickson, Jr. | 148/690 |

* cited by examiner

HIGH STRENGTH FRICTION STIR WELDING

FIELD OF THE INVENTION

The present invention relates to high strength friction stir welding. More particularly, the present invention relates to reducing material property degradation during friction stir welding of precipitation hardened parent materials.

BACKGROUND OF THE INVENTION

Figure 1:
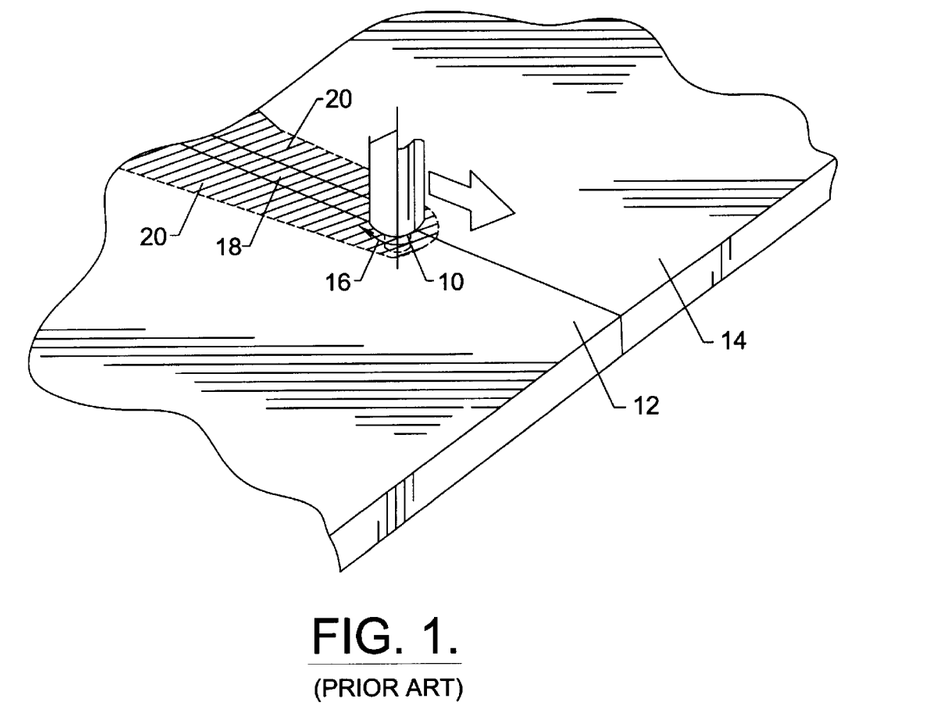
FIG. 1 is a fragmentary perspective view showing the joining of two workpieces through friction stir welding, as is known in the art.

Friction stir welding is utilized to join workpieces to form structural assemblies that can be used in the manufacture of military and commercial aircraft. As illustrated in FIG. 1, friction stir welding involves inserting a rotating friction stir welding probe 10 between the opposing faces of a pair of workpieces 12, 14 while urging the workpieces together. The rotation of the friction stir welding probe between the opposing faces of the workpieces creates friction that generates sufficient heat energy to plasticize the workpiece material in the weld zone 16. A weld joint 18 forms, joining the workpieces together in a unitary assembly, as the plasticized regions of the workpieces flow together and solidify in the weld zone. Alternatively, a plasticized region between the workpieces can be formed without utilizing a friction stir welding tool by moving one of the workpieces relative to the other while concurrently urging the workpieces together.

One particular benefit of friction stir welding is that the formation of the weld joint 18 is autogenous and is created by the solidification of the plasticized parent materials rather than a filler material, as is commonly used in conventional welding processes. However, the frictional heat necessary to plasticize the workpiece material during friction stir welding can degrade the mechanical properties of the parent materials. As shown in FIG. 1, during friction stir welding, the frictional heat created by the rotating friction stir welding probe 10 is conducted from the weld zone 16 through the workpieces 12, 14 into the ambient environment, creating a heat-affected region 20 around the weld zone. The elevated temperatures associated with the friction stir welding process can degrade the mechanical properties of the parent materials, including the strength, stiffness, and ductility, in both the weld zone and the heat-affected region.

Material property degradation is particularly problematic when friction stir welding precipitation hardened parent materials, which have improved mechanical properties obtained through expensive solution and precipitation heat treatment processes. When friction stir welding precipitation hardened workpieces, the joined workpieces commonly require an additional quenching cycle, including heat treating the workpieces at a predetermined temperature schedule and then rapidly cooling the workpieces. The quenching process must then be followed by either natural or artificial aging at a second predetermined temperature schedule to recover the parent material properties. Quenching operations are not only costly, but can warp the welded assembly resulting in poor dimensional quality and requiring additional straightening processes that further increase the cost of manufacture.

Thus, there is a need for improved methods of friction stir welding heat treated materials, and particularly precipitation hardened materials. Such manufacturing methods should be cost effective, as well as minimizing the degradation of the material properties obtained through precipitation hardening.

SUMMARY OF THE INVENTION

The present invention provides a method for reducing the material property degradation during friction stir welding by friction stir welding materials in a nonequilibrium state and having a correspondingly incomplete temper. According to the present invention, the first and second structural members are solution heat treated at a first predetermined temperature schedule. Next, the first and second structural members are quenched to a predetermined temperature at which the structural members have an incomplete temper and are in a nonequilibrium state. The first structural member is then positioned adjacent to the second structural members, thereby defining an interface therebetween. Thereafter, the first and second structural members are joined to form a structural assembly by friction stir welding the material along the interface prior to precipitation heat treating the structural assembly.

In particular, the structural assembly formed by joining the first and second structural members is preferably precipitation hardened by aging the structural assembly at a second predetermined temperature schedule which stabilizes the material properties and completes the temper of the resulting structural assembly and creates a structural assembly. The structural assembly is then cooled to ambient temperature. The structural assembly can then be secured to other structural assemblies so as to form the frame of an aircraft.

Simultaneously with the joining step, the first and second structural members are further quenched to reduce the size of the heat-affected region in the first and second structural members. In one embodiment, the quenching step includes applying a liquid coolant to the first and second structural members using at least one liquid coolant jet. In another embodiment, the quenching step includes applying a gaseous coolant to the first and second structural members using at least one gaseous coolant jet. In another embodiment, the quenching step includes applying a liquid coolant to the first and second structural members by submersing the first and second structural members in a liquid coolant bath.

Therefore, the present invention provides a method for forming a precipitation hardened structural assembly which overcomes the shortcomings of conventional techniques. The method requires fewer manufacturing steps than conventional techniques for friction stir weld precipitation-hardened parent materials. In addition, the method minimizes the degradation of the material properties during friction stir welding, and produces a structural assembly with improved strength and hardness, as well as dimensional quality.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, and wherein.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 2A:
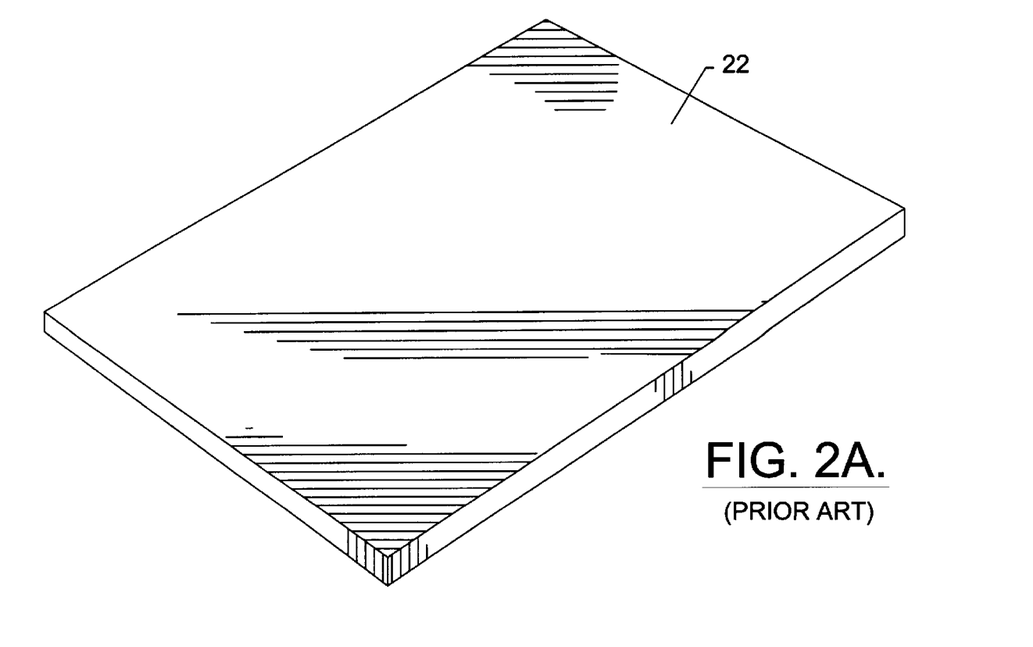
FIG. 2A is a perspective view showing a structural member of preselected dimensions fabricated from a precipitation-hardenable metal alloy, as is known in the art.

Referring now to the drawings, and in particular to FIG. 2A, there is shown a structural member 22 formed of a precipitation-hardenable metal alloy having two or more alloying elements. The structural member may be machined, through known manufacturing means, from a single workpiece into a predetermined shape and thickness as required by the specific design loads and specifications of the resulting structural assembly. For example, a CNC milling machine can be used to machine the structural member as necessary.

In order to improve the mechanical properties of the structural member 22, including the strength, hardness, and corrosion resistance of the member, the member is preferably precipitation hardened. Precipitation hardening of metal alloys is a process whereby the mechanical properties of the metal alloy are improved by the formation of uniformly dispersed particles or precipitates of one or more secondary phases within the original phase matrix. Precipitation hardening requires that the metal alloy undergo two heat treatment processes, the first process being a solution heat treatment and the second process being a precipitation heat treatment.

Figure 2B:
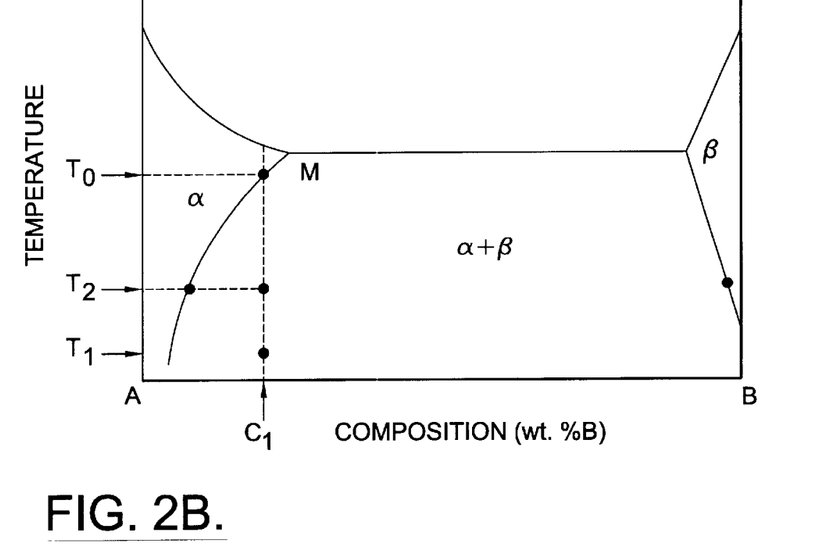
FIG. 2B is a hypothetical phase diagram for a precipitation-hardenable binary metal alloy system.

Referring to FIG. 2B, there is shown a hypothetical phase diagram for a precipitation-hardenable metal alloy composed of alloying elements A and B. Although FIG. 2B illustrates a phase diagram for a binary system, precipitation-hardenable metal alloys may contain two or more alloying elements. For a metal alloy to be precipitation hardenable, the alloy must have an appreciable maximum solubility of one element in the other, on the order of several percent; and a solubility limit that rapidly decreases in concentration of the major element with temperature reduction. Both of these requirements are satisfied by the hypothetical phase diagram of FIG. 2B, where the maximum solubility is designated by M. Additionally, the composition of a precipitation-hardenable metal alloy must be less than the maximum solubility M. Examples of some of the binary and ternary metal alloys that are precipitation hardenable include aluminum-calcium, aluminum-chromium, aluminum-cobalt, aluminum-copper, aluminum-iron-titanium, aluminum-gallium-germanium, a-luminum-gallium-indium, aluminum-germaniumtin, aluminum-lithium, aluminum-lithium-magnesium, aluminum-manganese, aluminum-molybdenum, aluminum-nickel-titanium, aluminum-niobium, aluminum-silicon, copper-beryllium, copper-tin, magnesium-aluminum, as well as some ferrous alloys.

Figure 2C:
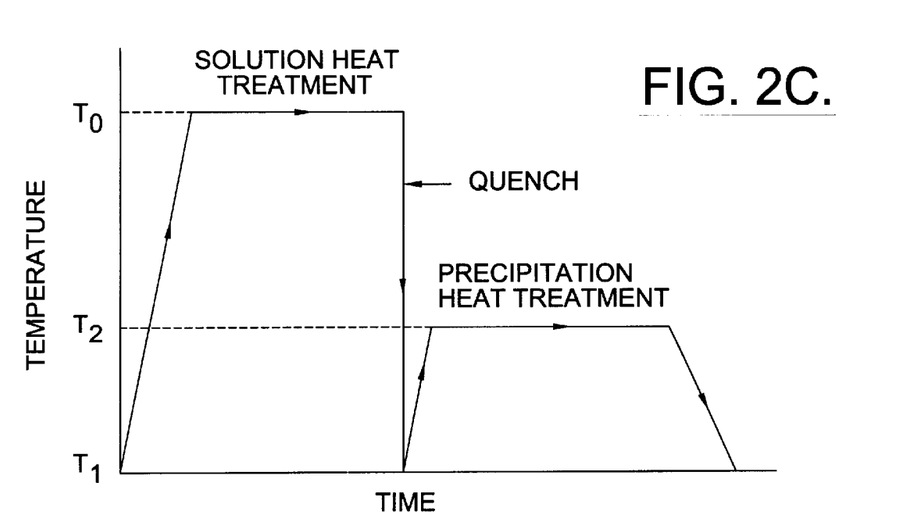
FIG. 2C is a schematic temperature-versus-time plot showing both solution and precipitation heat treatments for precipitation hardening of the hypothetical binary metal alloy system of FIG. 2B.

In the hypothetical binary system illustrated in FIG. 2B, element A designates the original phase matrix, while element B designates the solute or secondary element. To form the uniformly dispersed particles or precipitates of the secondary alloying element within the original phase matrix of the structural member 22, the phase associated with the secondary alloying element must first be completely dissolved, such that the only remaining phase is the phase associated with the original phase matrix. The phase associated with the secondary alloying element is dissolved through a solution heat treatment process at a first predetermined temperature schedule. To illustrate the solution heat treatment process, reference is made to FIG. 2B and the metal alloy composed of a predetermined percentage of elements A and B designated by $C_1$. At ambient temperature, the hypothetical metal alloy of the structural member will be in an equilibrium state and will contain both the $\alpha$ phase of element A and the $\beta$ phase of element B. During the solution heat treatment process, the temperature of the structural member is raised to temperature $T_0$. At temperature $T_0$, the $\beta$ phase or solute atoms of element B begin to dissolve. As shown in FIG. 2C, the structural member is maintained at temperature $T_0$ for a sufficient period of time, designated $t_1$, to allow all of the $\beta$ phase to dissolve so that the alloy contains only the $\alpha$ phase of composition $C_1$.

Once the $\beta$ phase has completely dissolved, the structural member is rapidly cooled or quenched to ambient temperature, which is designated by $T_1$, as shown in FIGS. 2B and 2C. The rapid cooling inhibits the formation of the $\beta$ phase so that only the $\alpha$ phase solid solution supersaturated with B atoms is present. However, the structural member in the $\alpha$ phase at this temperature is in a nonequilibrium state with an incomplete temper, such that generally the $\beta$ phase will gradually begin to form in the existing $\alpha$ phase matrix. In this nonequilibrium state, most metal alloys are relatively soft and weak. Advantageously, diffusion rates of B atoms at temperature $T_1$ for most metal alloys are extremely slow, such that the structural member may be retained in the $\alpha$ phase at temperature $T_1$ for a relatively long period of time. Thus, all the structural members of a structural assembly, such as an aircraft or other aerospace vehicle, may be fabricated and solution heat treated prior to joining the members in a unitary assembly.

Figure 3:
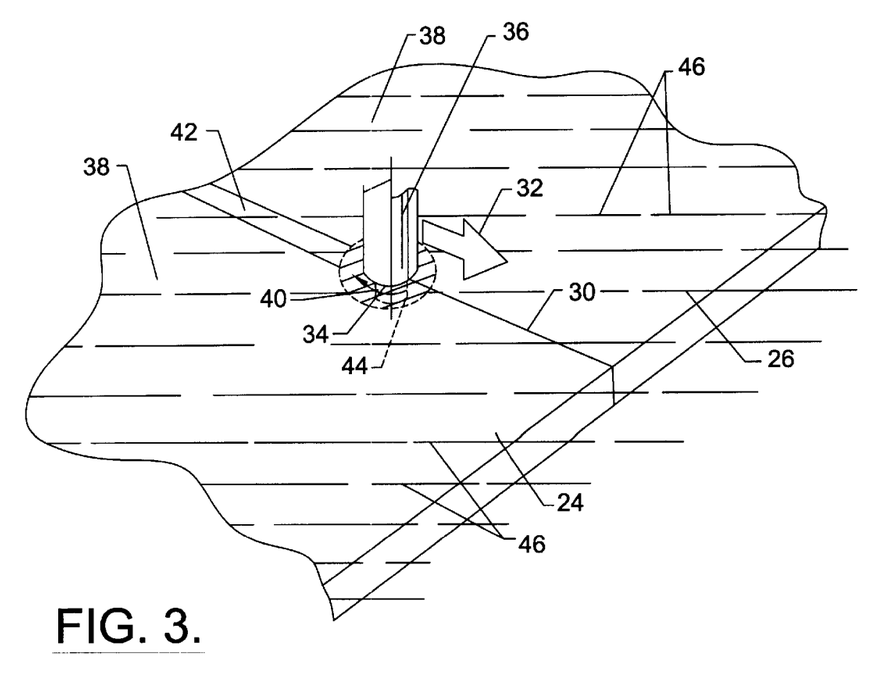
FIG. 3 is a fragmentary perspective view showing the joining of first and second structural members, according to one embodiment of the present invention.
Figure 4:
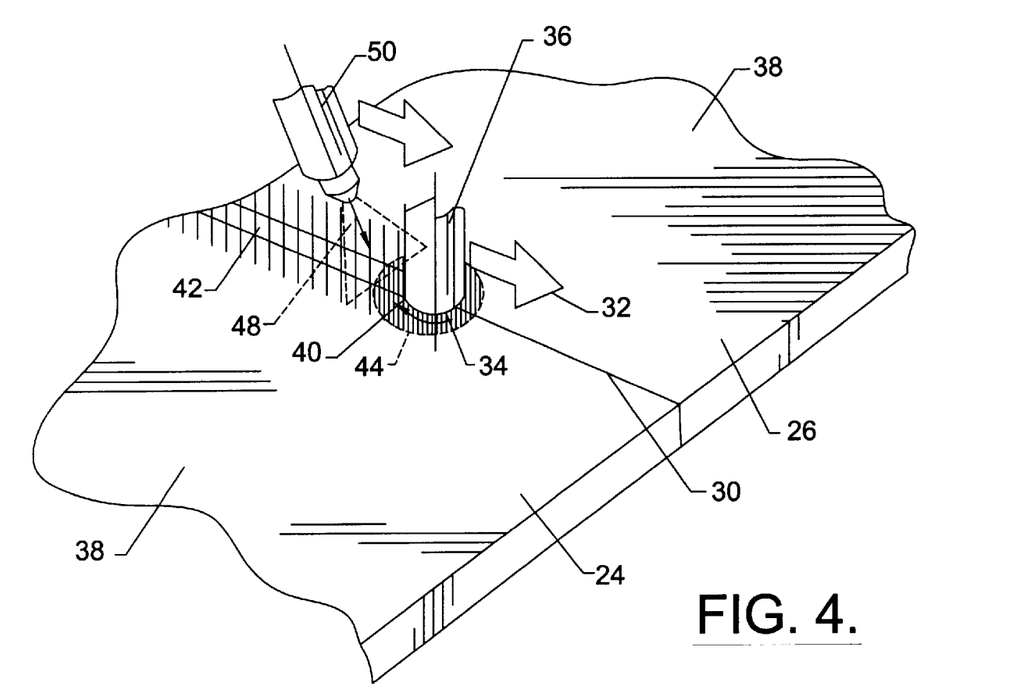
FIG. 4 is a fragmentary perspective view showing the joining of first and second structural members, according to an alternate embodiment of the present invention.

As illustrated in FIGS. 3 and 4, the structural members 24, 26, both of which have been solution heat treated, but have an incomplete temper, are preferably joined by friction stir welding to form a structural assembly. Friction stir welding creates a severely deformed, but highly refined grain structure at the weld joint. Further, because friction stir welding results in a more narrow heat-affected region when compared to fusion welding processes, friction stir welding is not limited to selected alloys with properties that are suitable for conventional welding. Friction stir welding also eliminates a number of defects related to conventional welding, such as micro-cracks, poor ductility, lack of fusion, porosity and most importantly, minimization of distortion, which can adversely effect the shape and tolerances of the joined component members. To join the workpieces by friction stir welding, the structural members are positioned relative to one another such that the members define an interface 30 along the length of the members. The structural members may be secured so as to prevent movement of the members relative to one another. For instance, the structural members may be secured to each other by spot welding or using a mechanical clamp. The structural may then be secured to the work table by means of a conventional clamp (not shown).

The structural members 24, 26 are then joined to one another by friction stir welding along the interface 30 of the members, which defines a welding path 32 between the members. For a general discussion of friction stir welding, see U.S. Pat. No. 5,460,317 to Thomas et al., the contents of which are incorporated herein by reference. Specifically, a rotating friction stir welding probe 34, which is attached to a friction stir welding tool 36 is forced through the outer surfaces 38 of the structural members. The frictional heat generated by the rotating probe creates a plasticized region or weld zone 40 between the structural members. The rotating probe 34 is then moved along the path defined by the interface between the structural members to thereby form a continuous friction stir weld joint 42 along the length of the members, thus forming a unitary-structural assembly, albeit still having somewhat unstable material properties since the temper of the material is incomplete.

During friction stir welding, the frictional heat created by the rotating friction stir welding probe 34 is conducted from the weld zone 40 through the structural members 24, 26 and into the ambient environment. The conduction of the heat through the structural members creates a heat-affected region 44 around the weld zone 40. As shown in FIG. 3, the size of the heat-affected region may be reduced according to one embodiment of the present invention by submerging the structural members in a bath of liquid coolant 46, such as water, during the friction stir welding process. The composition of the liquid coolant may vary so long as the liquid coolant is chemically non-reactive with the alloying elements of the structural members to avoid contaminating the weld joint 42. For example, the liquid coolant can be an aqueous or organic solution, such as water, oil or ethylene or propylene glycol.

In an alternate embodiment, as illustrated in FIG. 4, the size of the heat-affected region 44 may be reduced by applying a continuous stream of cooling fluid 48 through one or more coolant jets 50. Preferably, the cooling fluid is applied to the weld zone 40 immediately behind the friction stir welding probe 34. In an another embodiment, the stream of cooling fluid may be applied in multiple locations to the area of the structural members surrounding the weld zone (not shown). In yet another embodiment, the stream of cooling fluid may be applied to both sides of the structural members (not shown). The cooling fluid may include any non-reactive liquid coolant or chilled gas. In a preferred embodiment, the cooling fluid includes chilled nitrogen gas. Preferably, the coolant jet or jets 50 are mounted to the friction stir welding machine or are otherwise moveable so that the jets remain at a fixed distance relative to the friction stir welding tool 36 and probe 34.

The application of cooling fluid during friction stir welding to structural members in a nonequilibrium state reduces the size of the heat-affected region 44, and further, simulates a quench cycle which advantageously maintains the recently welded material in a nonequilibrium state substantially similar to the parent material so that the entire member can subsequently be aged to obtain the desired temper. However, because the cooling fluid is continuously applied to the weld zone between the structural members, the temperature differential between the structural members and the coolant is not as severe as is typically the case with conventional heat treating and quenching processes. As such, the risk of warping the joined structural members is greatly reduced under the present invention compared to the risk of warping the same were the entire assembly to be subsequently solution heat treated. The quenching cycle inhibits the formation of the secondary phase particles within the original phase matrix, thus maintaining the joined structural members in a predominantly single-phase solid solution state supersaturated with secondary atoms. The friction stir welding process and accompanying quenching process may be repeated to join additional structural members to the structural assembly to form the desired assembly configuration.

Once all the structural members of the structural assembly are joined, the precipitation hardening of the component structural members of the assembly may be completed by naturally or artificially aging the assembly to the desired temper at a predetermined temperature schedule. Referring again to FIGS. 2B and 2C, artificial aging or precipitation heat treatment requires that the structural assembly undergo an isothermal heat treatment whereby the temperature of the assembly is raised to a predetermined temperature, designated by $T_2$, for a predetermined amount of time, designated $t_2$. The temperature $T_2$ is within the $\alpha$ and $\beta$ two-phase region of the hypothetical phase diagram and is a temperature at which the diffusion rates for the B atoms become appreciable. The diffusion of the B atoms into a $\beta$ phase results in the formation of finely dispersed particles of the B alloy element. Once the desired amount of diffusion has taken place, the structural assembly may be cooled to room temperature. Advantageously, the cooling rate from temperature $T_2$ generally does not affect the resulting material properties of the metal alloy. As such, the structural assembly manufactured according to the present invention does not require further quenching or straightening operations prior to installation. Upon cooling, the structural assembly may be installed by attaching the assembly to other structural assemblies, so as to form the frame of an aircraft.

The character of the $\beta$ phase particles, and thus the strength and hardness for a given metal alloy used to form the structural members is dependent upon the precipitation temperature, designated $T_2$, and the aging time at this temperature, designated $t_2$. Notably, some metal alloys will age at room temperature over an extended period of time, commonly denoted natural aging, while other metal alloys require artificially raised temperatures, commonly denoted artificial aging.

Figure 2D:
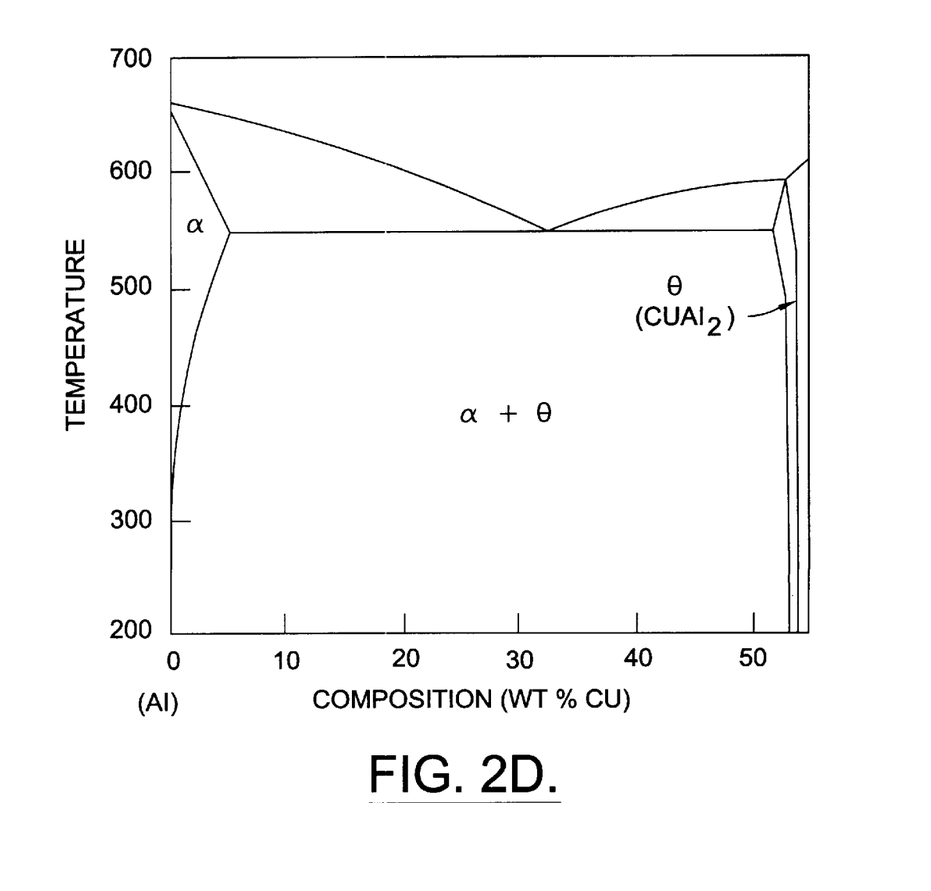
FIG. 2D is a phase diagram for an aluminum-copper metal alloy system.

Referring now to FIG. 2D, there is shown a binary system phase diagram for aluminum and copper adapted from *Metals Handbook: Metallography, Structures and Phase Diagrams*, Vol. 8, 8th edition, ASM Handbook Committee, T. Lyman Editor, American Society for Metals, 1973, p. 259., to further illustrate the solution heat treatment and precipitation heat treatment processes. From the diagram, the temperature range (previously designated $T_0$) to solution heat treat an aluminum-copper metal alloy having a known composition of wt % copper (previously designated $C_1$) so as to completely dissolve the copper atoms can be determined. The time period necessary to completely dissolve the copper atoms, previously designated $t_1$ hours, is dependent upon the material composition, $C_1$, and the temperature, $T_0$, and can be readily determined by those skilled in the art. Upon completing the solution heat treating, the resulting alloy has an incomplete temper and is in a nonequilibrium state. Once the solution-heat-treated structural members have been joined by friction stir welding, including quenching the weld zone and heat-affected regions created by the friction stir welding process, the precipitation heat treatment process could then be conducted at a temperature range of approximately 100 to 300° C. (previously designated $T_2$) for $t_2$ hours to complete the temper and stabilize the material properties. The time period, $t_2$, being dependent upon the material composition, $C_1$, and the temperature, $T_2$, and can be readily determined by those skilled in the art.

Figure 5:
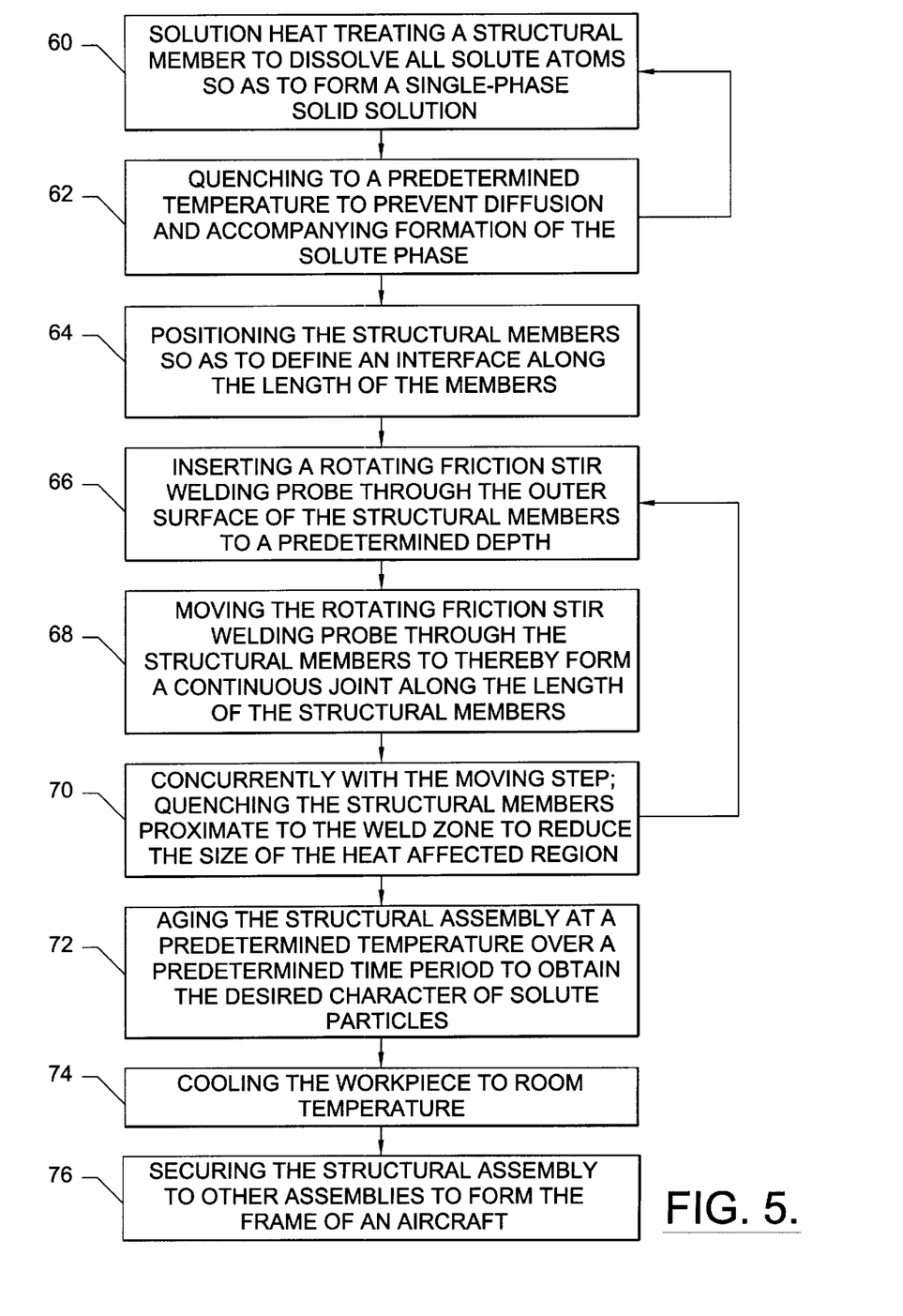
FIG. 5 is a flow chart showing the operations performed according to one embodiment of the present invention in order to friction stir weld the structural members of FIGS. 3 and 4.

Referring now to FIG. 5, there is illustrated the operations performed to manufacture a structural assembly according to one embodiment of the present invention. The first step includes solution heat treating a structural member to dissolve all solute atoms so as to form a single-phase solid solution. See block 60. The second step involves quenching the structural member to a predetermined temperature to prevent diffusion and the accompanying formation of any of the solute phase. See block 62. The first and second steps may then be repeated as necessary to solution heat treat the structural members of the resulting structural assembly.

Next, two of the solution heat treated structural members are positioned so as to define an interface along the length of the members. See block 64. A rotating friction stir welding probe is then inserted through the outer surface of the structural members to a predetermined depth. See block 66. The friction stir welding probe is then moved through the structural members along the path created by the interface of the members to thereby form a continuous weld joint along the length of the structural members. See block 68. Concurrently with the moving step, the structural members are quenched proximate to the weld zone to reduce the size of the heat-affected region. See block 70. The inserting, moving, and quenching steps may then be repeated as necessary to join any remaining structural members of the resulting unitary-structural assembly.

The structural assembly is then aged or precipitation heat treated at a predetermined temperature over a predetermined time period to obtain the desired character of solute particles. See block 72. Thereafter, the structural assembly is cooled to room temperature. See block 74. The structural assembly may then be secured to other assemblies, such as adjacent wing or fuselage panels, to form the frame of an aircraft. See block 76.

Therefore, the present invention provides a method for forming a precipitation hardened structural assembly which overcomes the shortcomings of conventional techniques. Fewer manufacturing steps are required to practice the present invention than are necessary with conventional techniques for friction stir weld precipitation-hardened parent materials. In addition, the method minimizes the degradation of the material properties during friction stir welding, and produces a structural assembly with improved strength, hardness, and corrosion resistance, as well as dimensional quality.

In the drawings and the specification, there has been set forth a preferred embodiment of the invention and, although specific terms are employed, the terms are used in a generic and descriptive sense only and not for purpose of limitation, the scope of the invention being set forth in the following claims.

That which is claimed is:

1. A method for reducing material property degradation during friction stir welding, the method comprising the steps of:

solution heat treating first and second structural members at a first predetermined temperature schedule;

quenching the first and second structural members following said solution heat treating step to a predetermined temperature at which the first and second structural members are in a nonequilibrium state;

positioning the first structural member adjacent to the second structural member following said quenching step to thereby define an interface therebetween; and thereafter, joining the first and second structural members to form a structural assembly by friction stir welding the first and second structural members along the interface prior to precipitation heat treating the resulting structural assembly to stabilize the material properties of the structural assembly.

2. A method as defined in claim 1, further comprising the step of machining the first and second structural members to a corresponding preselected shape and thickness prior to said positioning step.

3. A method as defined in claim 1, further comprising the step of further quenching the first and second structural members simultaneously with said joining step to reduce the size of a heat-affected region in the first and second structural members created by said friction stir welding.

4. A method as defined in claim 3 wherein said further quenching step comprises applying a liquid coolant to the first and second structural members using at least one liquid coolant jet.

5. A method as defined in claim 3 wherein said further quenching step comprises applying a gaseous coolant to the first and second structural members using at least one gaseous coolant jet.

6. A method as defined in claim 3 wherein said further quenching step comprises applying a liquid coolant to the first and second structural members by submersing the first and second structural members in a liquid coolant bath.

7. A method as defined in claim 3, further comprising the step of precipitation heat treating the structural assembly by aging the structural assembly at a second predetermined temperature schedule.

8. A method as defined in claim 1, further comprising the step of cooling the structural assembly to ambient temperature.

9. A method as defined in claim 8, further comprising the step of securing the structural assembly following said cooling step to other structural assemblies to form the frame of an aircraft.

10. A method for reducing material property degradation during friction stir welding, the method comprising the steps of:

solution heat treating first and second structural members at a first predetermined temperature schedule;

quenching the first and second structural members following said solution heat treating step to a predetermined temperature, wherein said solution heat treating and quenching steps are conducted such that the resulting structural members have an incomplete temper;

positioning the first structural member adjacent to the second structural member following said quenching step to thereby define an interface therebetween; and thereafter, joining the first and second structural members to form a structural assembly by friction stir welding the first and second structural members along the interface even though the first and second structural members have an incomplete temper.

11. A method as defined in claim 10, further comprising the step of machining the first and second structural members to a corresponding preselected shape and thickness prior to said positioning step.

12. A method as defined in claim 10, further comprising the step of further quenching the first and second structural members simultaneously with said joining step to reduce the size of a heat-affected region in the first and second structural members created by said friction stir welding.

13. A method as defined in claim 12 wherein said further quenching step comprises applying a liquid coolant to the first and second structural members using at least one liquid coolant jet.

14. A method as defined in claim 12 wherein said further quenching step comprises applying a gaseous coolant to the first and second structural members using at least one gaseous coolant jet.

15. A method as defined in claim 12 wherein said further quenching step comprises applying a liquid coolant to the first and second structural members by submersing the first and second structural members in a liquid coolant bath.

16. A method as defined in claim 12, further comprising the step of precipitation heat treating the structural assembly by aging the structural assembly at a second predetermined temperature schedule.

17. A method as defined in claim 10, further comprising the step of cooling the structural assembly to ambient temperature.

18. A method as defined in claim 17, further comprising the step of securing the structural assembly following said cooling step to other structural assemblies to form the frame of an aircraft.

* * * * *